Figure 1:
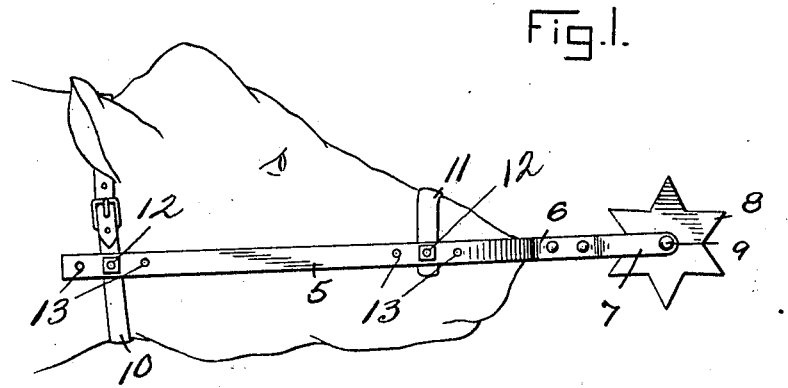

No. 871,555. PATENTED NOV. 19, 1907.
C. E. BALLARD.
ANIMAL MUZZLE.
APPLICATION FILED JUNE 20, 1907.

Witnesses
G. R. Thomas
E. St. John Oertel

Inventor
Charley E. Ballard
By Chandler & Chandler
Attorneys

UNITED STATES PATENT OFFICE.

CHARLEY E. BALLARD, OF GUTHRIE CENTER, IOWA.

ANIMAL-MUZZLE.

No. 871,555.　　　　Specification of Letters Patent.　　　　Patented Nov. 19, 1907.

Application filed June 20, 1907. Serial No. 379,942.

*To all whom it may concern:*

Be it known that I, CHARLEY E. BALLARD, a citizen of the United States, residing at Guthrie Center, in the county of Guthrie, State of Iowa, have invented certain new and useful Improvements in Animal - Muzzles; and I do hereby declare the following to be a full, clear, and exact description of the invention, such as will enable others skilled in the art to which it appertains to make and use the same.

The present invention has reference to muzzles or weaning devices for calves and colts, and it aims to provide a simple and inexpensive as well as efficient device of that class.

To this end the invention, briefly described, comprises a pair of cheek - bars whose forward ends are secured together and are provided with a multi-pointed pricker rotatably mounted there-between, the cheek-bars being further connected at their rear ends by a neck strap, and at their forward ends by a nose-strap, the under jaw of the animal being entirely unconfined by the nose-strap.

The invention will be readily understood from a consideration of the following detailed description, and its preferred embodiment is illustrated in the accompanying drawings, in which like parts are designated by corresponding reference numerals in the several views.

Figure 2:
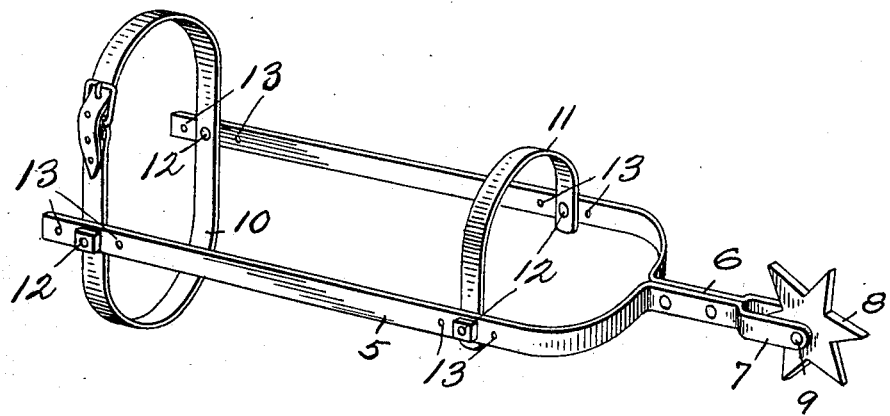

Of the said drawings, Figure 1 is a side elevation of the muzzle in position upon the head of a calf, Fig. 2 is a perspective view of the muzzle.

Referring more particularly to the drawings, the muzzle is shown as comprising a pair of oppositely - disposed cheek - bars 5 whose forward ends are bent inwardly into contact with each other as indicated by the numeral 6, and are bolted together at such point. The perforated extremities 7 of these inbent portions are bent outward, as shown, to provide a space therebetween in which a pricking device in the form of a multi-pointed star 8 is disposed, said star being rotatably mounted upon a bolt 9 whose opposite ends fit in the above mentioned perforations. The cheek-bars are connected towards their rear ends by a strap 10, which, when the muzzle is in place, completely encircles the neck of the animal, its opposite ends being buckled or otherwise connected together. Towards the inbent portions 6 the cheek-bars are further connected by a strap 11, which, however extends only across the nose of the animal, leaving its under jaw unconfined.

The threaded bolts 12, by means of which the neck and nose straps are connected to the cheek-bars, are interchangeably engaged in a series of correspondingly located threaded perforations 13 which are formed through the cheek-bars, so that the position of said straps with respect to the latter may be varied as desired, thus rendering it possible to adjust the muzzle to animals of various sizes. Owing to the fact that the strap 11 passes only across the nose of the animal, its under jaw is completely unconfined, and the animal can therefore be fed from a bucket or trough.

What is claimed is,

An animal muzzle comprising a pair of oppositely - disposed cheek - bars, having their forward ends bent inwardly into contact with each other, the extremities of said bent portions being perforated and bent outwardly, away from each other; a bolt fitted in said perforations; a multi-pointed pricking device rotatably mounted upon said bolt between the outwardly bent extremities of said cheek-bars; a neck strap connecting said cheek-bars at their rear ends; and a nose strap connecting said cheek-bars adjacent the inwardly bent portions thereof.

In testimony whereof, I affix my signature, in presence of two witnesses.

CHARLEY E. BALLARD.

Witnesses:
　W. H. STREMSOR,
　W. W. HULL.